United States Patent [19]

Van Trang

[11] 4,293,914

[45] Oct. 6, 1981

[54] AUTOMATIC CONTROL SYSTEM FOR CARWASH INSTALLATIONS

[76] Inventor: Nguyen Van Trang, 139 Alta Ave., Santa Monica, Calif. 90402

[21] Appl. No.: 42,128

[22] Filed: May 24, 1979

[51] Int. Cl.³ ............................................. G05B 19/00
[52] U.S. Cl. ............................. 364/478; 15/DIG. 2; 340/673; 364/900
[58] Field of Search ............... 364/478, 479, 200, 900; 222/76; 15/DIG. 2, 313, 319; 134/45, 46; 340/52 H, 673, 676

[56] References Cited

U.S. PATENT DOCUMENTS

| | | | |
|---|---|---|---|
| 3,809,919 | 5/1974 | Aaron | 15/DIG. 2 |
| 3,822,009 | 7/1974 | Richards | 340/676 |
| 3,828,317 | 8/1974 | Mette | 364/900 |
| 3,854,054 | 12/1974 | Conn, Jr. | 15/DIG. 2 |

*Primary Examiner*—Errol A. Krass
*Attorney, Agent, or Firm*—Julian J. Schamus

[57] ABSTRACT

An automatic control system for carwash installations is constructed with electromechanical logic elements—relay-operated switching devices and timer-controlled switches—combined into an Input Control Unit and into a plurality of Program Control Units. Each vehicle entering the carwash is automatically assigned to one of the Program Control Units which performs the sequence of operations, including optional operations such as the application of hot wax to the vehicle, in the proper sequence as the automobile travels along the conveyer of the installation. No controllers or sensors are required to be installed along the conveyor, and the conveyor itself is automatically stopped when there are no automobiles moving along the conveyor, or when there is a possibility of a collision between successive vehicles leaving the conveyor system.

4 Claims, 6 Drawing Figures

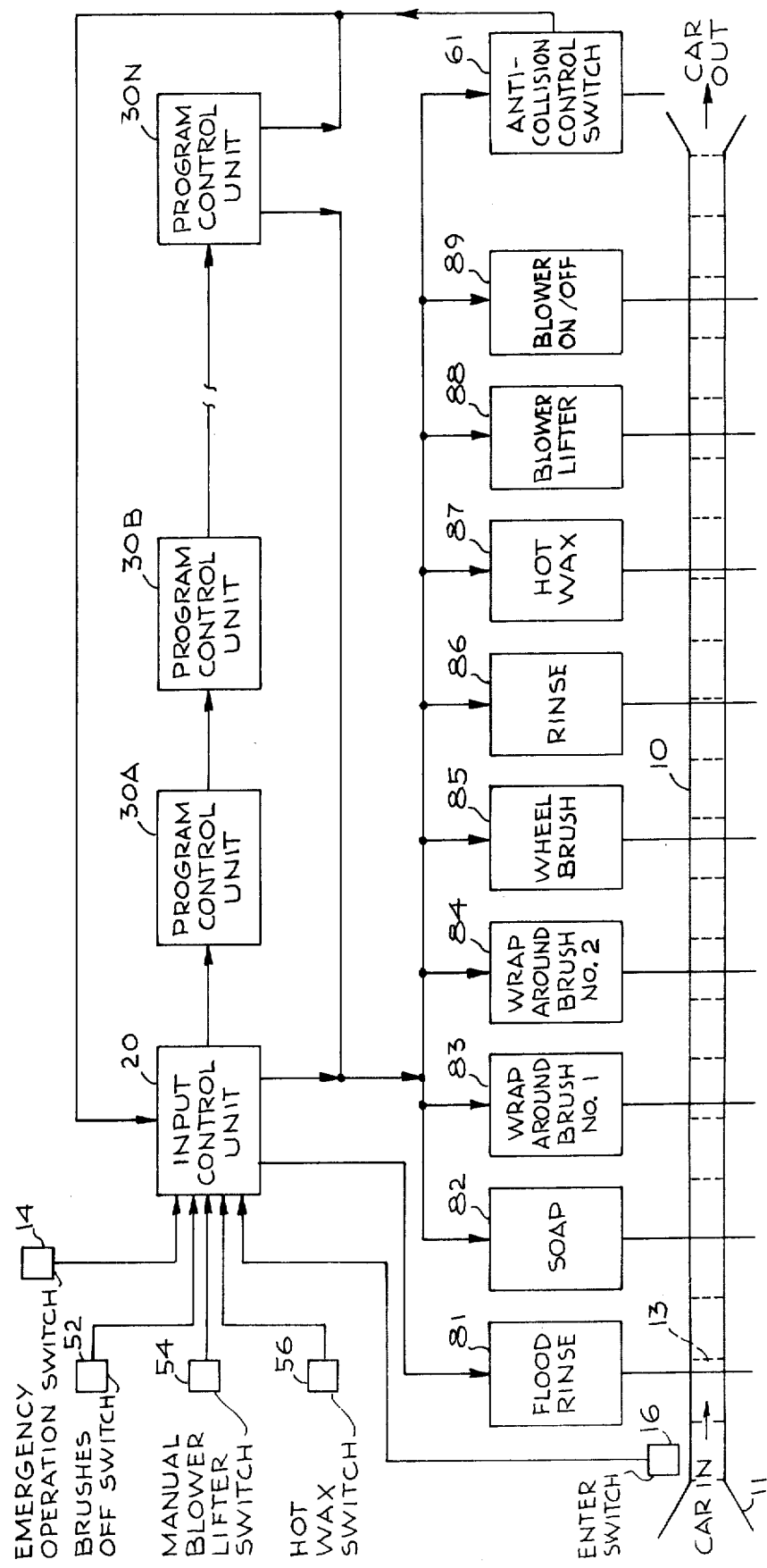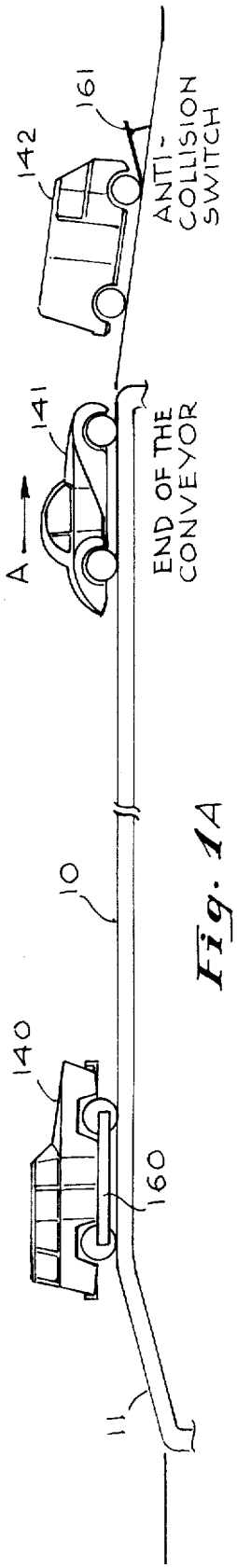
Fig. 1
Fig. 1A

AUTOMATIC CONTROL SYSTEM FOR CARWASH INSTALLATIONS

BACKGROUND OF THE INVENTION

The invention relates to controls for automobile carwash installations. More particularly, it relates to controls which activate a plurality of subsystems disposed along a conveyor bearing automobiles to be washed through timer-activated logical controls.

The art of constructing and using carwash installations in which an automobile is carried along a conveyor past work stations performing specific tasks—whose totality adds up to a complete cleaning job on the vehicle—are well known in the prior art. Such conventional car washes are based on sensors associated with each, or most, task-performing devices which sense the presence, or approach, of a vehicle and activate the appropriate function.

Such sensors are commonly wand-operated limit switches, proximity switches, or guide rollers attached to particular components, such as rotary brushes. The use of such sensors in the inhospitable environment produced by the water, steam, soap and chemical agent saturated confines of the carwash leads to a large number of maintenance problems and can result in the inefficient use of scarce resources, such as hot water, to overcome positioning errors and other factors associated with mechanical and electro-mechanical direct-acting controls.

Even greater difficulties are encountered in carwash control systems of conventional construction when it is desired to selectively activate certain work stations for particular vehicles; for example by dispensing hot wax where the driver is willing to pay for the higher charges associated with such service.

While proximity sensors and photoelectric devices avoid some of the problems associated with mechanically actuated position indicators, such as possible marring of automobile surface finishes or interfering with external trim, the large variety of shapes, sizes and constructional materials in automobiles make them less accurate and reliable in providing accurate position signals. For these reasons, the use of sensors along the carwash conveyor as parts of the operational control system are attended by many practical difficulties and problems.

It is, therefore, a primary object to the invention to provide controls for a carwash installation incorporating a plurality of active devices disposed alongside a conveyor, in which the position of the individual vehicles is tracked by logical devices, rather than determined by position sensors.

It is a further object of the invention to provide controls for a carwash installation capable of performing a wide range of optional tasks on individual automobiles as they travel along the conveyor, through the assignment of a dedicated program control unit to each vehicle as it enters the installation.

It is also an object of the invention to teach the construction of program control units, and associated control equipment, resulting in economical and reliable control systems for a carwash environment.

SUMMARY OF THE INVENTION

The aforementioned objects, and other objects and advantages which shall become apparent from the detailed description of the preferred embodiment of the invention, are attained in a control system integrated with conventional drive means and layouts for the carwash installation conveyor and for the several task-performing devices disposed along the conveyor.

The control system of the invention comprises an Input Control Unit which receives signals from automatic and manual switches reporting the presence of a vehicle at the beginning and the end of the conveyor of the carwash installation and which specify the optional tasks which are to be performed on a particular vehicle entering the conveyor.

The Input Control Unit generates appropriate signals in electrical conductor buses, or their equivalents in control systems based on pneumatic or hydraulic logic elements. These signals emanating from the Input Control Unit are made available to a number of Program Control Units disposed along the aforementioned signal buses in a sequential manner. The Program Control Units are so constructed that the first quiescent PCU along the sequence accepts the commands transmitted by the Input Control Unit, stores the catalogue of tasks to be performed as the vehicle travels from the beginning to the end of the carwash conveyor, and locks its input gates against any signals which may be transmitted along the signal buses during the time the vehicle assigned to it transits the carwash installation.

Subsidiary systems ensure that the conveyor is stopped should a vehicle approach the end of the conveyor before the preceding vehicle had been removed from the holding area into which it had been discharged after completing the cleaning process, that the optional tasks allotted to a particular Program Control Unit are retained in its memory if the conveyor should come to a stop for any reason, and provide a manual override capacity should circumstances require bypassing the automatic control sequence.

In the preferred embodiment of the invention the logic devices utilized in the Input Control Unit and in the several Program Control Units, whose number must correspond to the maximum vehicle-carrying capacity of the conveyor through the active length of the carwash, are electromechanical in nature, utilizing relay-operated electrical switching elements and timer controllers synchronized with the movement of the conveyor.

Due to the ready availability and inherently high reliability of such components, and the ease which which they can be protected environmentally in any suitable location, adjacent to or remote from the carwash installation proper, the control system of the invention attains a very high degree of reliability, low manufacturing and installation cost, and ease of repair and maintenance should such become necessary. There are no controllers or sensors in the area of the task-performing devices along the conveyor, the required signals for the operation of the several devices being transmitted directly—for example by powering certain electrical conductors—to the active elements at each task-performing station.

BRIEF DESCRIPTION OF THE ACCOMPANYING DRAWING

The preferred embodiment of the invention will be described below, with reference to the accompanying drawing, wherein:

FIG. 1 is a schematic diagram of the main components of the carwash installation and of the control system of the invention;

FIG. 1A is a diagrammatic representation of the conveyor of the carwash installation and the entrance and exit sensors associated therewith;

Figure 2:
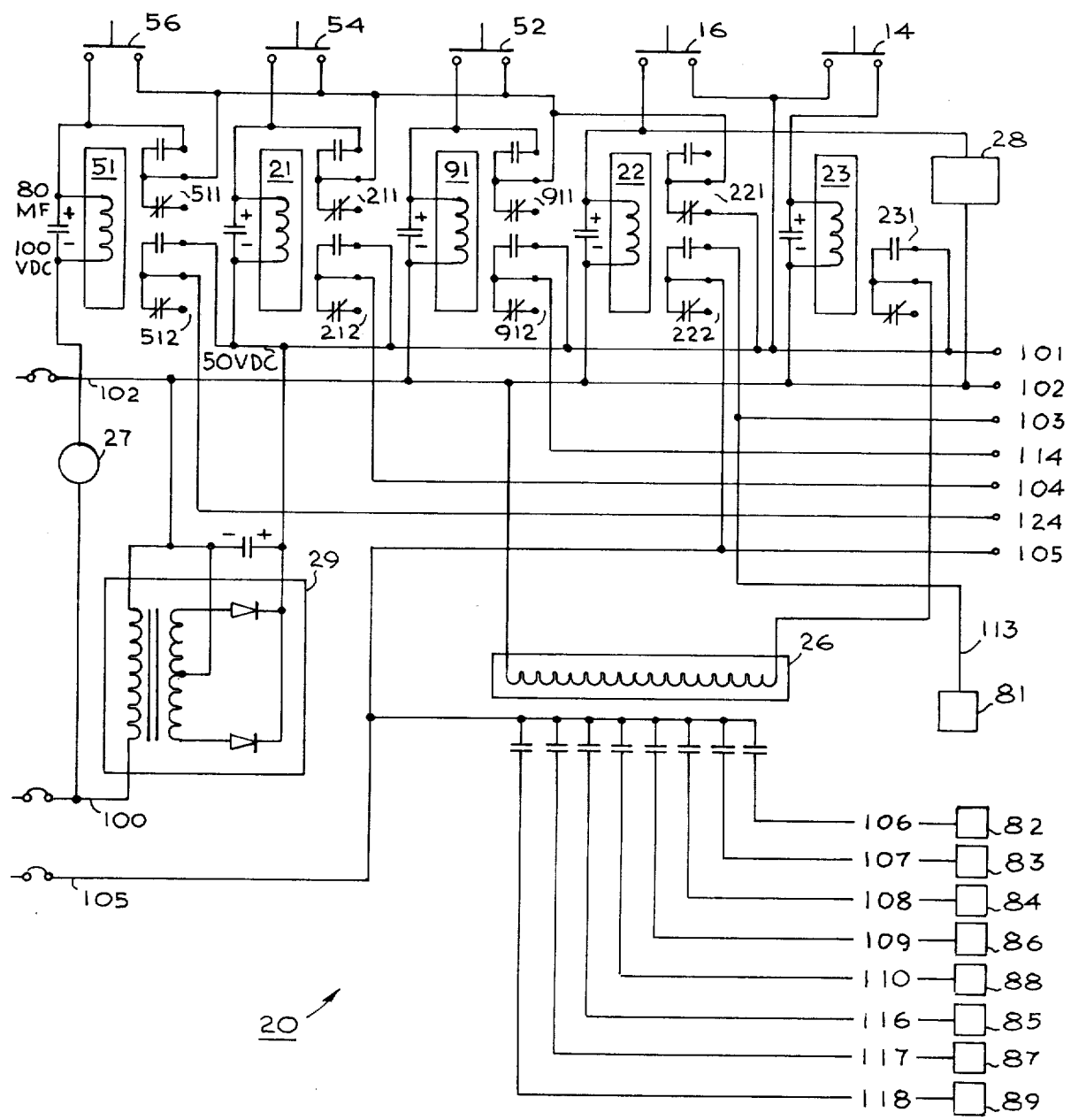
FIG. 2 is a schematic diagram of the logical control components of the Input Control Unit of the invention.

FIG. 1 is a schematic diagram of a carwash installation with a conveyor 10, upon which individual automobiles may be entrained by means of drive pins 13 after the vehicle had been aligned with the longitudinal axis of the conveyor 10 by entrance guideway 11. The construction of the conveyor 10 is in any one of the conventional modes known in the art and forms no specific part of the invention.

Once a vehicle is entrained on the conveyor 10 it is subjected to a number of operations as it progresses down the conveyor past work stations 81 through 89. The number of stations and their individual functions are adapted to the particular needs of the installation and the arrangement and provision of individual work stations, as illustrated and described, is intended for explicatory purposes only. In the installation depicted in FIG. 1 the work stations are: a flood rinse station 81, a soap dispensing station 82, wrap-around brush stations 83 and 84, a separate wheel brushing station 85, a clear water rinse station 86, a hot wax application station 87, and a blower station 89, with the latter equipped with an optional blower lifter device 88. The blower lifter device 88 is brought into play when it is desired to prevent physical contact between the blower nozzles and a particularly tall vehicle—a truck, for example.

An enter switch 16 is provided proximate to the guideway 11, to signal the presence of a vehicle to be processed in the carwash, and an anti-collision switch 61 is provided beyond the end of the conveyor 10.

In contrast to a conventional carwash, which relies on switching elements along the conveyor 10 for activating the several work stations—wand-operated limit switches, proximity switches or photoelectric devices—the installation of the invention relies on logical controls requiring no switching elements exposed to the hostile environment of the carwash proper and obviates the many operational and maintenance problems commonly associated with such sensors.

A number of manually actuated monetary switches are utilized to signal the desired mode of operation to an input control unit 20, which, in turn, governs the operation of a number of program control units 30. The program control units, hereinafter referred to as PCU's and indexed as 30A, 30B, 30C, through 30N, are equal in number to the capacity of the conveyor 10 within the active length of the carwash and may, or may not, be equal to the number of work stations. Work stations, whose functions are mutually compatible, may be located along the same segment of the conveyor 10 and, conversely, the conveyor may pass through areas without active work station—to allow time for the drainage of rinse water, for example. It is necessary, however, that a PCU be available for each vehicle as it enters the region of the conveyor 10 where the first PCU-controlled work station, the soap dispenser 82 in FIG. 1, is located.

The input control unit receives signals from the enter switch 16, and from the option control switches—manually activated by the carwash operator—including a 'brushes off' switch 52, a blower lifter switch 54, and a hot-wax switch 56. The internal logic of the input control unit 20—hereinafter abbreviated as the ICU—is such that the option-defining switches 52, 54, and 56 must be activated prior to the switch 16 signalling the actual presence of a vehicle on the conveyor. Once the enter switch 16 is closed, by a car passing the actuating element thereof, the ICU transmits appropriate signals to the first available PCU 30 and activates, directly, the flood rinse station 81. Thereafter, the PCU assigned to the particular vehicle will track it along the conveyor 10 and activate the various work station devices as the vehicle comes into the appropriate segment of the conveyor.

While the enumerated components fully satisfy the normal functioning of the carwash installation, the possibility exists that some error or malfunction causes a need to operate the work stations manually. An emergency operation switch 14 is provided for this purpose; it functions by energizing all the work stations along the conveyor—bypassing the PCU's as long as the switch 14 is held depressed. This mode of operation may be resorted to if, for example, the operator has neglected to press one of the optional control switches 52-56 or when a vehicle, already entrained on the conveyor, becomes disengaged from the appropriate drive pins 13 and moves on the conveyor out of phase with the position held in the memory of the PCU controlling the work to be performed thereon. Once the automobile necessitating the application of the emergency control mode has passed through the carwash, the switch 14 is de-energized and the automatic control of the installation by the ICU and the operating PCU's is resumed.

FIG. 2 is a schematic diagram of the principal active components of the ICU 20 and of the associated control switches and power supplies.

For the purposes of illustration only, the ICU 20 in FIG. 2 is shown operating from a single-phase 120 volt alternating current supply established between conductors 100 and 102. This supply is used to power a rectifier 29 which establishes a 50 volt DC supply circuit between conductors 101 and 102. A separate AC current source is represented by conductor 105; it is essentially the equivalent of the current source feeding the conductor 100 but is controlled, by means not shown, parallel with the drive of the conveyor 10, in a manner more fully shown in FIG. 2A. The circuit established between conductors 105 and 102 is powered, consequently, whenever the conveyor 10 is operating and is turned off whenever the conveyor has stopped.

A group of switching relays, including relays 51, 21, 91, 22 and 23, is powered from the DC circuit of conductor 101, each of these relays being associated with one of the control switches governing the operation of the ICU 20. p For example, the hot wax control switch 56 is connected to conductor bus 101 through a normally closed switch terminal in relay-operated switch 221 of relay 22; a momentary actuation of the switch 56, thereof, results in relay 51 becoming energized. The relay 51 will remain energized as long a current is supplied through switch 221, due to a self-latching circuit through the normally open terminals of switch 511. A second relay-operated switch 512 associated with relay 51 connects a control conductor 124 with the DC power supplied through the conductor 101. An analogous circuit through the switch 54 and operated by relay 21 provides current to a conductor 104. The third manually operated option switch 52 coacts with relay 91 to interconnect conductor 114 with the power supply of bus 101 through a switch 912.

Once the optional control signals onto conductors 124, 104 and 114 have been established—in varying combinations, as required by the washing process for a specific vehicle about to enter the carwash—the vehicle is placed on the conveyor 10 and allowed to trip the enter switch 16. The activation of the enter switch 16 pulls in the relay 22 and transfers the switching elements of relay-controlled switches 221 from the normally closed to the normally open terminals, thereby cutting off the current to relay coils 51, 21 and 91 on the one hand, and providing AC power from conductor 105 to conductors 103 and 113, on the other. The signal appearing on conductor 103 is utilized by the PCU's 30 as a start signal, as will be more fully explained with reference to FIG. 3 and 3A, while the signal on conductor 113 operates the flood rinse work station 81 and begins the carwashing sequence. Each of the relay coils 51, 21 and 91 is provided with a DC capacitor which retains the associated coils in an energized state for a brief period after the cessation of direct current supply through the latching circuits, thereby ensuring the presence of actuating signals on conductors 124, 104 and 114 simultaneously with the signal to conductor 103.

The emergency operation switch 14—should it be actuated by the operator—energizes the coil of a relay 23 and supplies current, via the normally open terminals of a relay-operated switch 231, to the coil of relay 26. The relay 26 is shown, schematically, as controlling a plurality—eight in the illustrated embodiment—of normally open switching elements connected between conductor 105 and conductors serving each of the work stations 82 and 89. As long as the switch 14 remains depressed, and as long as the conveyor 10 continues to run, each function of the carwash installation beyond the flood rinse station 81, remains energized, independent of any control signals generated by the PCU's 30. In a preferred embodiment, when the switch 14 is released, a 40 second time delay is provided before the signals generated by PCU's 30 will start performing the program again.

An electric pulse counter 28, with either mechanical or electronic readout, is provided in the circuit of switch 16, and provides an indication of the number of automobiles entering the carwash installation on a daily or totalizing basis.

Figure 2A:
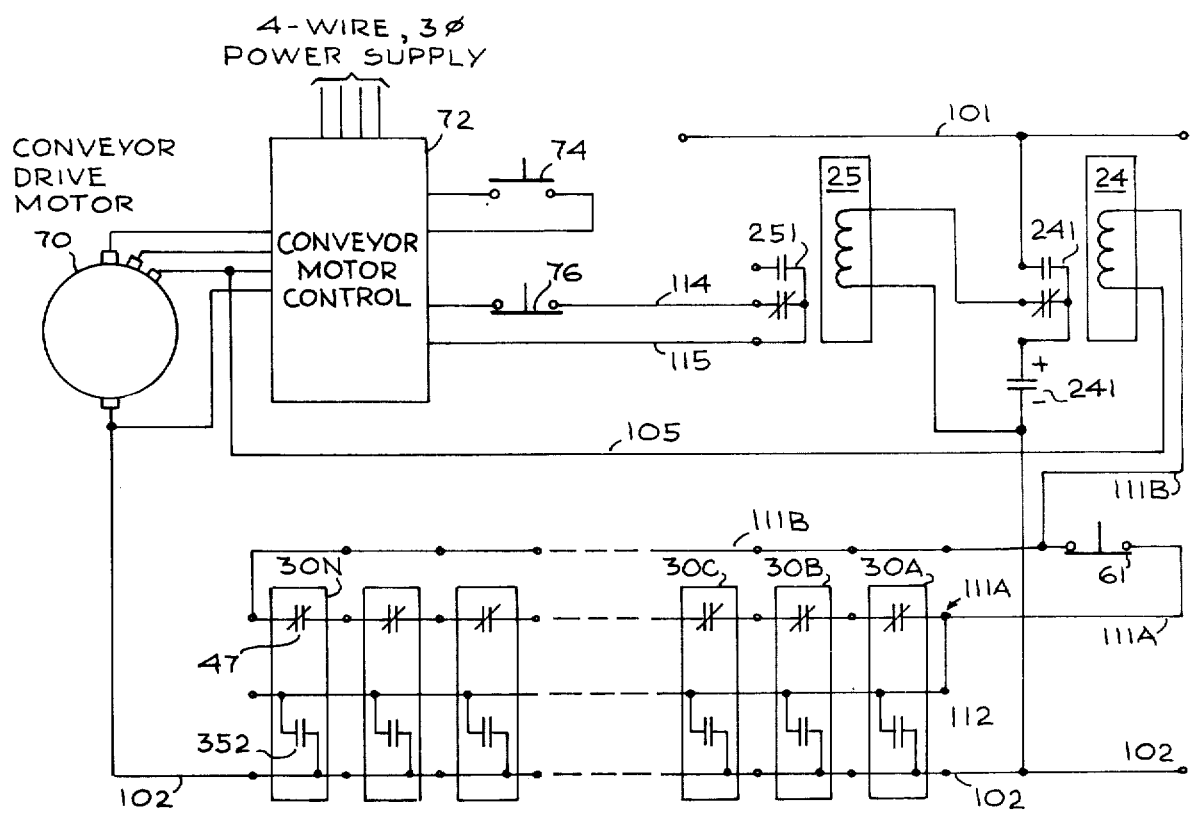
FIG. 2A is a schematic diagram of the conveyor control portion of the system.

FIG. 2A is a schematic representation of the conveyor stop control circuitry. For purposes of illustration only it will be assumed that the conveyor 10 is provided with a drive motor 70 in the form of a 3-phase electric motor, controlled by a motor controlled 72. The controller 72 is, in turn, governed from a manual start switch 74 and is also provided with a manual stop switch 76.

Apart from the manual control switches 74 and 76, whose function is primarily that of turning the conveyor on at the beginning of the business day and turning it off again at the end of carwash operations, an automatic control system is also provided which shuts the drive motor 70 down if one of two conditions obtain: first, the sensed presence of a vehicle at the end of the conveyor before a preceding vehicle had been moved from the holding position to which it is automatically allowed to roll at the end of the washing cycle, after leaving the conveyor proper; and second, the absence of any automobile on the conveyor, as indicated by the inactivity of all Program Control Units in the system. The first of these conditions is provided as an anti-collision measure, to prevent the bumping of two vehicles leaving the controlled carwash system in succession. The second condition for stopping is an ecomony measure and requires a manual restart of the conveyor when the next automobile is presented for the wash cycle.

Both these stop control conditions are signalled to the motor controller 72 by the provision, in tandem with the manual switch 76, of an automatically operated, normally closed contact, switch 251 associated with a relay 25. The relay coil 25 is connected across a DC capacitor 241 which is charged, and discharged, under the control of a relay-operated switch 241 whose relay coil 24 is powered, from the motor supply conductor 105, at all times except when one of the switches 47 in the PCU timers is opened—indicating the presence of a vehicle at the end of the conveyor—at the same time as a treadle switch 61, located beyond the end of the coneyor, is held in the open position by an automobile which had already left the conveyor but had not been moved from the holding station.

The conductor 111 B from the coil 24 passes through switch 61, or ganged switches 47, to a conductor 112 which is, in turn, connected to common conductor 102 through switches 352 in each PCU 30. When all PCU's are idle, the associated switches revert to the normally open condition and the current flow through relay coil 24 ceases, resulting in the delivery of a 'stop' signal to motor controller 72.

FIG. 1A is a diagrammatic representation of the carwash conveyor 10 in elevation showing two vehicles 140, 141 on the conveyor proper and a third vehicle 142 in a position in the holding area just beyond the end of the conveyor. The vehicle 140 is at the very beginning of the conveyor 10, just past the entrance guideway 11, and has engaged an operating bar 160 associated with the enter switch 16. The operating bar is so sized and arranged that it will be continuously actuated as long as either the front or rear wheel of the vehicle 140—or its equivalent—is passing along the bar. This ensures a continuous and sustained signal pulse generation by the enter switch 16.

The vehicle 141 is in position at a very end of the conveyor 10, in such a location that the timer 40 associated with the Program Control Unit assigned to the vehicle 141 at the beginning of the wash cycle has opened switch 47 driven from the timer motor 40. This switch interacts with the anticollision switch 61, operated by a treadle 161 in the floor of the holding area, so as to signal the simultaneous presence of both vehicles 141 and 142 and to secure the cessation of conveyor movement in the direction of the arrow 'A' until such time as the vehicle 142 is removed from the holding area and the treadle 161 permits the switch 61 to resume its normally closed configuration.

Figure 3A:
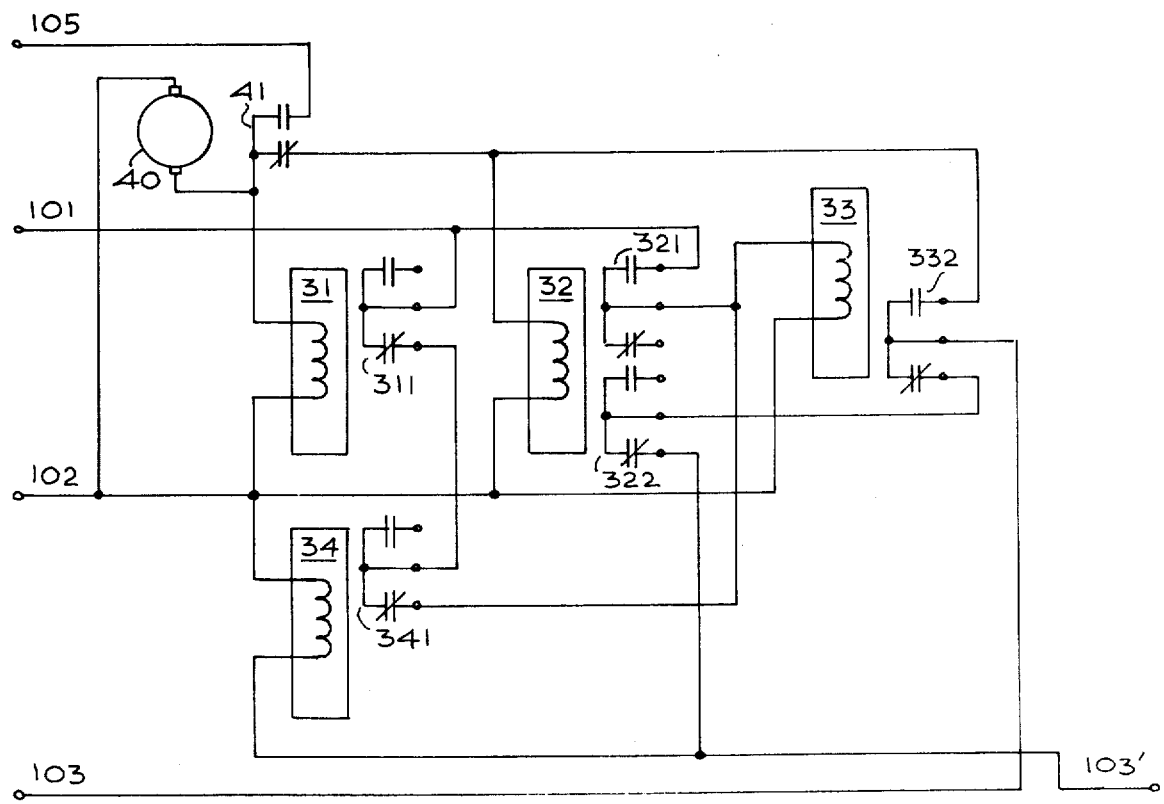
FIG. 3A is a subset of the logic components of the embodiment of FIG. 3 associated with the acceptance or rejection of control over the processing of a particular automobile by a particular Program Control Unit.
Figure 3:
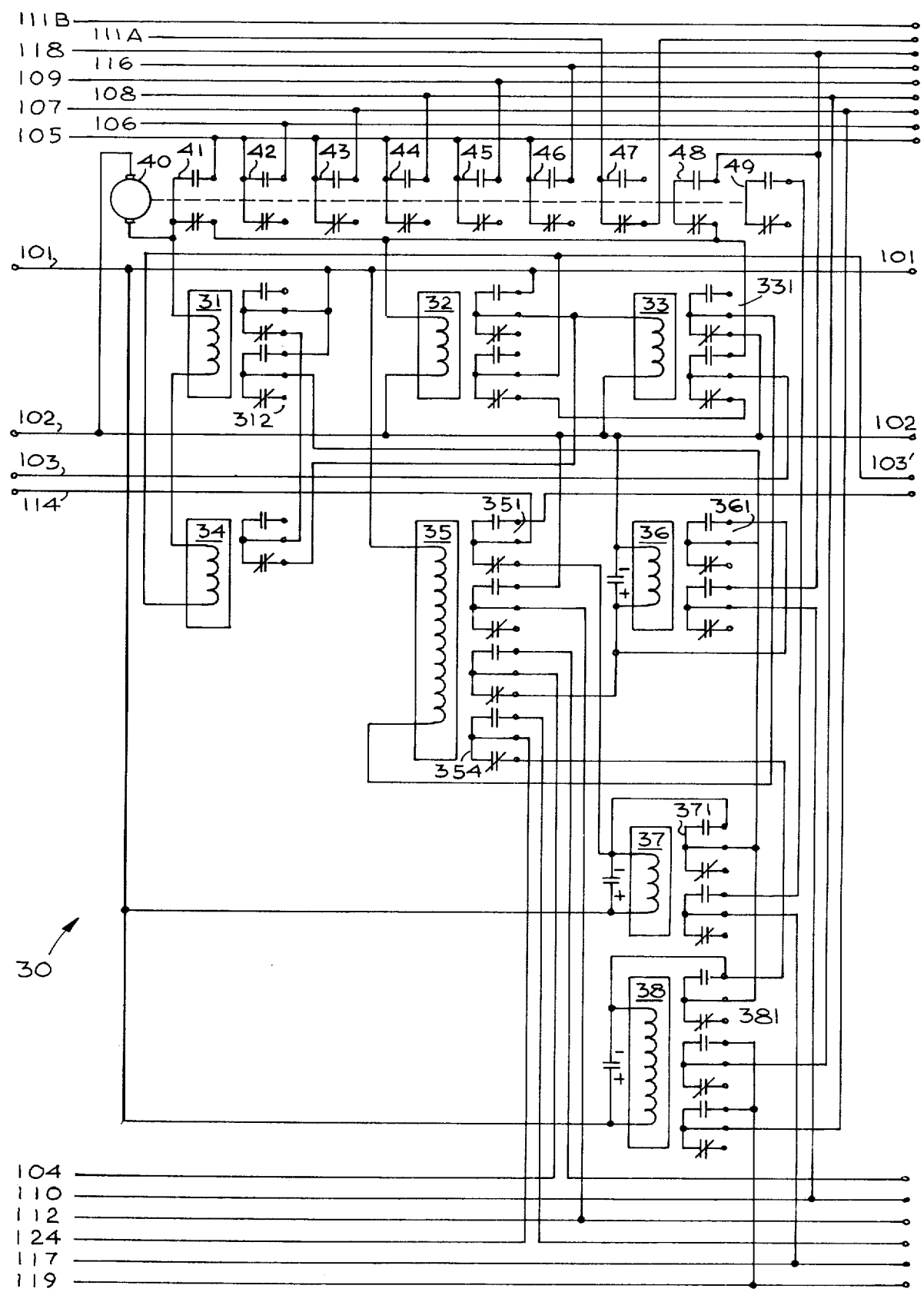
FIG. 3 is a schematic diagram of one of the plurality of identical Program Control Units in the control system of the invention.

FIG. 3 is a schematic diagram detailing the logic circuitry of a typical PCU 30, including a timer motor 40 with associated timing switches 41-49 and with control relays 31-37.

The operations of the PCU 30 are suitably broken into two periods: an initial, or quiescent, period during which the PCU is inactive with the timer motor 40 unpowered; and an active period during which the PCU has assumed the task of controlling the various work stations of the carwash in response to a signal appearing on conductor 103.

The manner in which the start signal on conductor 103 is accepted by the first free PCU connected to the ICU 20 will be described in greater detail with reference to FIG. 3A, a partial schematic omitting all components of the PCU 30 not associated with the initiation of the active period.

At the start of the active period the timer motor 40 is set into motion—for purposes of illustration the timer motor is depicted as a clock-drive powered from the 120 volt alternating current circuit of conductor 105—turning a series of rotary cams acting on individual control switches. The period of a single rotation of the cam drive powered by the timer motor 40 corresponds exactly to the transit time of an automobile through the carwash on conveyor 10. The cams are adjustable, by one of the several means known in the control art, so that the associated switches may be set to turn on and off at any desired time lapse after the initiation of the motor rotation. The timer motor 40 is set to unlatch itself from the drive current at the end of one rotation.

While the preferred embodiment of the invention incorporates a rotary timer, the same effect can be attained through the use of rotary stepping relays, driven from timed pulses synchronized with conveyor movement, or by the use of time-delay relays, or other time-based control means.

One of the principal objectives of the use of the bus 105 for the powering of the timer motor 40, and for powering the controls of the several work stations in the carwash, is that a temporary stoppage of the conveyor—to correct a defect or as a result of a temporary failure of the power distribution system—allows the PCU to remain set in the mode commanded by the ICU 20 and to continue to complete the assigned work sequence upon the restoration of the conveyor motor drive current.

A control relay 35 is also provided with four relay-operated switches—351 through 354, for the sake of clarity of illustration the index numerals for switches 352 and 353 have been omitted from the diagram—with the coil of the relay 35 connected across the DC power supply of conductors 101 and 102 through the normally closed terminals of switch 331. This ensures that the relay 35 is powered whenever the PCU 30 is in operation. The switches 351, 353 and 354 are utilized to interrupt the conductors 114, 104 and 124, respectively, through their normally open terminals; with the PCU in a working mode, these conductors are made continuous through the corresponding switches so that the signal pulses representing the optional features in the carwash cycle can be transmitted to the next program control unit.

As the optional control switches 52, 54 or 56 are activated the signals are transmitted, via the normally closed circuits of relay-controlled switches 354, 353, or 351, to relays 38, 36 and 37, respectively. These relays self-latch through the normally open terminals of switches 381, 361 and 371 to conductor 101 through the normally open circuit of switch 312. This ensures that these optional action defining relays will remain powered as long as the timer 40 is running, or, more inclusively, until the working cycle of the PCU 30 is completed. The remaining switches controlled by the latched relays are utilized to power the appropriate conductors—118 for the blower lifter device, 107 and 108 for the drives of brushes 83 and 84, and 117 for the hot wax dispenser 87—with the power supply from conductor 105 routed through the appropriate timing switches—48 for the blower drive and 49 for the hot wax, 43 and 44 for the brush drives—to ensure proper phasing of the operation, or nonoperation of the designated components.

The schematic diagram of FIG. 3A illustrates the switching network or gate control means, employed to select the next available Program Control Unit when the entrance of a vehicle onto the washer conveyor is signalled by the appearance of a current pulse—whose duration is set by the entrance switch 16—on the line 103.

In the quiescent state of the PCU, the timer control motor 40 is unpowered and is connected to the common terminal of a timer-controlled switch 41. The only power entering the PCU is derived between the DC supply line 101 and the common line 102 which provide energization to the coil of relay 33, via the normally closed terminals of relay-controlled switches 311 and 341.

The signal generated by the closure of enter switch 16 is conveyed to the normally closed terminal of timer-controlled switch 41, via line 103 and the normally open terminal of relay-controlled switch 332—bearing in mind that the relay switch 33 is powered from the DC supply of line 101. This process provides current to the timer motor 40 and initiates the working sequence of the PCU. As the timer-controlled switch 41, set to activate within a time period shorter than the duration of the entrance switch pulse, closes the normally open terminal, the timer motor power supply is transferred to line 105 in the conveyor motor supply circuit.

Consequently, once a signal has appeared on line 103. the timer motor 40 is set into motion and, as long as the conveyor is running, will continue to provide the timed signals operating the subsidiary systems of the carwash. As long as the timer motor is powered, the relay 31, also connected to the common terminal of switch 41, is pulled in and the conductive path from line 101 to the coil of relay 33 is interrupted. To prevent premature transfer of control, the relay 33 is effectively latched 'on' by the entrance switch pulse current, through the activation of relay 32 and the alternate connection between the coil of relay 33 and line 101 through the normally open terminal of relay-controlled switch 321. At the termination of the entrance switch pulse, the relay 33 is unlatched by the de-energization of the coil of relay 32.

Should another vehicle enter the conveyor while the program of the particular PCU represented by the diagram of FIG. 3A is still in progress, the current pulse is transferred onto line 103 through the normally open terminal of relay-controlled switch 332. At the same time, to prevent potential interference should the program time of the PCU end while the entrance switch is still activated by the newly entering vehicle, the current in line 103 also energizes the relay coil 34 and interrupts the path to the coil of relay 33 through the normally closed terminal of relay-controlled switch 341.

With a number of PCU's cascaded along the entrance switch line—the line 103 of a preceeding PCU being connected to the 103 terminal of the next PCU, and so on—a vehicle passing through the entrance of the carwash will activate the first available PCU for the execution of the particular control sequence desired and will not interfere with the execution of any other program by any other PCU previously activated.

The system is failsafe, in that the interruption of the conveyor drive current will not alter the circuit configuration. As a result of this, an emergency stop or other cause for shutting down the conveyor temporarily can be undertaken with the certainty that once power is restored the PCU's will continue to execute the desired program. In installation with variable speed drives for the conveyor 10, each timer motor 40, or its functional equivalent must be slaved to the conveyor speed adjustment in such a manner as to maintain the synchronization between the timer action and the travel speed of the vehicles in the carwash.

I claim:

1. A control system for carwash installations incorporating a plurality of task-performing devices disposed along a conveyor adapted to bear vehicles from an entrance station towards a discharge station, comprising:

input control means, responsive to an enter switch disposed proximate to said entrance station and activated by the passage of a vehicle therethrough;

a plurality of program control units, each comprising timer control means adapted to be operative or inoperative and gate control means, responsive to signals from said input control means when said timer control means are inoperative, said program control units disposed sequentially along control paths between said input control means and said task-performing devices;

each of said timer control means operative to activate said task-performing devices in a pre-determined time sequence corresponding to the transit time of said conveyor between said entrance station and said discharge station;

each of said gate control means adapted to activate the timer control means associated therewith or to transfer said signals sequentially to another of said program control units, whereby said task performing devices incorporated in said carwash installation are activated in a time-synchronized manner as one or more vehicles transit said conveyor, with one of said program control units controlling the operation of the task-performing devices for each such vehicle.

2. The control system of claim 1, further comprising optional control means, for optionally-activated task-performing devices along said conveyor, wherein;

said input control means is additionally responsive to at least one manually-activated optional task control switch; and further comprising option control means in each of said program control units, adapted to govern the operation of each optionally-controlled task-performing device in said installation, in response to signals derived from the operation of said input control means.

3. The control system of claim 2, further comprising:

anti-collision means, including a switch sensing the presence of an automobile stationary in a holding area beyond the discharge station of the conveyor and the state of any one of said program control units indicative of the approach of an automobile into said discharge station; and including conveyor stop control means for ensuring the cessation of the movement of the conveyor until said stationary automobile is removed from the holding area.

4. The control system of claim 1, wherein said signal paths are electrical conductors and said signals are electrical potentials impressed on said conductors.

* * * * *